(12) United States Patent
Yokoi et al.

(10) Patent No.: US 8,702,305 B2
(45) Date of Patent: Apr. 22, 2014

(54) TEMPERATURE SENSOR

(75) Inventors: Hitoshi Yokoi, Aichi (JP); Masamichi Ito, Aichi (JP); Takaaki Chosokabe, Aichi (JP); Masahiko Nishi, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 246 days.

(21) Appl. No.: 12/489,754

(22) Filed: Jun. 23, 2009

(65) Prior Publication Data

US 2009/0323765 A1 Dec. 31, 2009

(30) Foreign Application Priority Data

Jun. 25, 2008 (JP) .................................. 2008-165267
Mar. 11, 2009 (JP) .................................. 2009-58705

(51) Int. Cl.
*G01K 7/00* (2006.01)
*G01K 7/18* (2006.01)

(52) U.S. Cl.
USPC ........... 374/163; 374/208; 374/141; 374/185; 338/22 R

(58) Field of Classification Search
USPC ................. 374/100, 141, 163, 183–185, 208; 702/130–136; 600/474, 549; 116/216; 338/22 R, 25, 28
See application file for complete search history.

(56) References Cited

U.S. PATENT DOCUMENTS

| | | | | |
|---|---|---|---|---|
| 2,510,397 A * | 6/1950 | Hansell | .......................... | 374/174 |
| 3,649,891 A * | 3/1972 | Lawless | .......................... | 361/276 |
| 3,759,104 A * | 9/1973 | Robinson | .......................... | 374/177 |
| 5,202,665 A * | 4/1993 | Hafele | .......................... | 338/25 |
| 5,366,770 A * | 11/1994 | Wang | .......................... | 505/477 |
| 5,413,981 A * | 5/1995 | Egawa et al. | .......................... | 505/121 |
| 5,483,414 A * | 1/1996 | Turtiainen | .......................... | 361/282 |
| 8,133,432 B2 | 3/2012 | Hasegawa | | |
| 8,328,420 B2 * | 12/2012 | Abreu | .......................... | 374/208 |
| 2002/0084884 A1 | 7/2002 | Takahashi et al. | | |
| 2003/0153143 A1 * | 8/2003 | Klein | .......................... | 438/200 |
| 2009/0297389 A1 | 12/2009 | Hasegawa | | |
| 2009/0323765 A1 * | 12/2009 | Yokoi et al. | .......................... | 374/185 |

FOREIGN PATENT DOCUMENTS

| | | |
|---|---|---|
| JP | 06-68963 A | 3/1994 |
| JP | 2000-39364 A | 2/2000 |
| JP | 2001-335862 A | 12/2001 |
| JP | 2008-26012 A | 2/2008 |
| JP | 2009-287077 A | 12/2009 |

OTHER PUBLICATIONS

Office Action ("Notification of Reasons for Refusal") dated Nov. 13, 2012 for corresponding Japanese Patent Application No. 2009-058705.
German Office Action issued Oct. 11, 2012 for corresponding Application No. 10 2009 030 023.6, Yes.
Closset, et al., "Structure and Properties of Hypoeutectic Al-Si-Mg Alloys Modified with Pure Strongtium", Metallurgical Transactions, vol. 13A, Jun. 19825, pp. 945-951.

* cited by examiner

*Primary Examiner* — Gail Verbitsky
(74) *Attorney, Agent, or Firm* — Sughrue Mion, PLLC

(57) ABSTRACT

In a temperature sensor (1), a pair of electrode wires (25) of a thermistor element (21) are formed of a material prepared by adding strontium to platinum or a platinum alloy and without addition of zirconia or a like oxide. Rear end portions of the electrode wires (25) formed of the above-mentioned material and front end portions of sheath core wires (3) are laser-welded to one another in an overlapping condition.

6 Claims, 5 Drawing Sheets

TEMPERATURE SENSOR

BACKGROUND OF THE INVENTION

1. Field of the Invention

The present invention relates to a temperature sensor having a temperature-sensing element, which has a temperature-sensing portion, such as a thermistor portion made of a thermistor material, or a platinum resistor, and is used to detect the temperature of an object of measurement. Particularly, the present invention relates to a temperature sensor preferably used to detect the temperature of an object of measurement, such as exhaust gas, in an environment exposed to vehicle vibration.

2. Description of the Related Art

Conventionally, a temperature sensor is known which has a temperature-sensing element and signal wires, the temperature-sensing element being composed of a thermistor portion and electrode wires extending from the thermistor portion where the electrode wires and the signal wires are welded (e.g., laser-welded) to one another in an overlapping condition. In the thus-configured temperature sensor, platinum or a platinum alloy (e.g., Pt—Rh alloy), having a high heat resistance and a low electrical resistance, is used to form the electrode wires of the temperature-sensing element. In view of heat resistance, strength, cost, etc., a stainless steel material or an INCONEL® material is used to form the signal wires.

A temperature sensor having such a configuration is used, for example, to detect the temperature of an object of measurement, such as exhaust gas, in an environment exposed to strong vibrations as in the case of the interior of a catalytic converter or an exhaust pipe of a vehicle. However, use in an environment exposed to such strong vibrations gives rise to a problem of breakage of the electrode wires of the temperature-sensing element due to the vibrations imparted to the temperature sensor. A technique to restrain breakage of the electrode wires is disclosed in Patent Document 1. Specifically, a dispersion-strengthened platinum material in which zirconia, yttria, or a like oxide is added to platinum or a platinum alloy is used to form the electrode wires of the temperature-sensing element.

[Patent Document 1] Japanese Patent Application Laid-Open (kokai) No. 2000-39364

3. Problems to be Solved by the Invention

As disclosed in Patent Document 1, application of a dispersion-strengthened platinum material, in which an oxide is added to the electrode wires, enhances the strength of the electrode wires. Thus, restrained breakage of the electrode wires can be expected. However, in a structure in which the electrode wires of the temperature-sensing element and the signal wires are welded to one another, zirconia, yttria, or a like oxide contained in a dispersion-strengthened platinum material does not melt at the time of welding of the wires, raising a problem of decreased strength of the weld zones. Specifically, the melting point of platinum is 1,770° C., and that of a platinum alloy is 2,000° C. or lower, whereas zirconia and yttria have very high melting points of 2,720° C. and 2,410° C., respectively. Accordingly, when the electrode wires are welded to the signal wires, such an oxide remains unmelted. This makes it difficult to strongly weld the electrode wires and the signal wires to one another. Thus, when a temperature sensor in which the electrode wires formed of an oxide-containing, dispersion-strengthened platinum material are welded to the signal wires is used in an environment exposed to strong vibrations, a new problem of fracture of a weld zone arises.

A temperature sensor is known which has an enclosing member made of metal, assuming the form of a closed-bottomed tube, and enclosing at least a temperature-sensing element and weld zones between electrode wires and signal wires. A ceramic filler is filled in at least a portion of an inner space enclosed by the enclosing member, the portion being located between one end of a temperature-sensing portion and a bottom portion of the enclosing member. When such a temperature sensor is rapidly cooled from a high temperature to a low temperature, a relatively large load is imposed on the weld zones for the following reason. When the temperature sensor is rapidly cooled from a high temperature to a low temperature, and thus the enclosing member begins to contract as a result of cooling, since the metallic enclosing member has a higher thermal expansion coefficient than the ceramic filler, the contraction of the internal filler fails to follow that of the enclosing member. Accordingly, the bottom portion of the enclosing member presses the temperature-sensing portion (temperature-sensing element) via the filler, so that a shearing stress is applied to the weld zones between the electrode wires and the signal wires.

In the case where the thus-configured temperature sensor employs a structure in which electrode wires formed of a dispersion-strengthened platinum material in which zirconia, yttria, or a like oxide is added are welded to signal wires to thereby form weld zones, since the strength of the weld zones is low as mentioned above, subjecting the temperature sensor to repeated rapid cooling from a high temperature to a low temperature raises another problem of likelihood of breakage (fracture) of wire at the weld zone(s).

SUMMARY OF THE INVENTION

The present invention has been made in view of the above-noted problems, and an object of the invention is to provide a temperature sensor in which, while the strength of electrode wires of a temperature-sensing element is enhanced, deterioration in the welding strength of weld zones between the electrode wires and signal wires can be prevented.

The above object of the invention has been achieved by providing (1) a temperature sensor which comprises a temperature-sensing element and signal wires. The temperature-sensing element has a temperature-sensing portion whose electric characteristic varies with temperature, and electrode wires whose front end portions are connected to the temperature-sensing portion and whose rear end portions extend outward from the temperature-sensing portion. The signal wires are welded to the rear end portions of the electrode wires in an overlapping condition and are adapted to lead an electric signal out from the temperature-sensing element. The electrode wires are formed of a material prepared by adding strontium to platinum or to a platinum alloy comprising platinum and at least one element (excluding platinum) selected from the platinum group.

The present invention is characterized in that the electrode wires of the temperature-sensing element are formed of a material prepared by adding strontium (Sr) to platinum or to a platinum alloy comprising platinum and at least one element (excluding platinum) selected from the platinum group. By adding strontium to platinum or to a platinum alloy, mechanical strength, particularly creep strength, of the electrode wires is significantly enhanced; i.e., the strength of the electrode wires of the temperature-sensing element is enhanced, without addition of zirconia, yttria, or a like oxide. The reason why the strength of the electrode wires is enhanced is uncertain. Presumably, the addition of strontium generates platinum-strontium intermetallic compounds (PtxSry: x and y are positive integers) which restrain coarsening of crystal grains of platinum or a platinum alloy in the electrode wires. Notably, the present invention does not preclude the presence of strontium within crystals of platinum or a platinum alloy. A component element, excluding platinum, of the platinum alloy selected from the Pt group denotes iridium (Ir), rhodium (Rh), ruthenium (Ru), osmium (Os), or palladium (Pd).

According to the present invention, the electrode wires are formed of a material prepared by adding strontium to platinum or to a platinum alloy comprising platinum and at least one element (excluding platinum) selected from the platinum group, and the electrode wires and the signal wires are welded to one another in an overlapping condition. Since the electrode wires contain strontium, whose melting point is lower than that of platinum, as opposed to a substance such as zirconia or yttria, whose melting point is higher than that of platinum, in welding of the electrode wires to the signal wires, the entire material of the electrode wires melts sufficiently. Thus, weldability does not deteriorate, thereby yielding good welding strength. Therefore, the present invention can provide a temperature sensor which exhibits excellent welding strength of weld zones between the electrode wires and the signal wires, while enhancing the strength of the electrode wires of the temperature-sensing element. Accordingly, the present invention can provide a temperature sensor which exhibits high reliability even in use in an environment exposed to strong vibrations as in a vehicle.

In a preferred embodiment (2) of the temperature sensor (1) of the present invention, the electrode wires contain strontium in an amount of 0.1% by mass to 1.0% by mass inclusive. When the strontium content is less than 0.1% by mass, the effect of addition of strontium is not sufficiently realized, so that the strength of the electrode wires may not be sufficiently enhanced. When the strontium content is in excess of 1.0% by mass, the excellent properties of platinum or a platinum alloy, such as excellent resistance to oxidation and heat, may deteriorate, and the workability of the electrode wires may also deteriorate. More preferably, in view of attaining appropriate strength by ensuring the above-mentioned properties of platinum, the strontium content is 0.2% by mass to less than 1.0% by mass.

In another preferred embodiment (3) of the temperature sensor (1) or (2) above of the present invention, with a view toward enhancing the strength of the electrode wires, when the electrode wires are observed on a section perpendicular to a center axis of the electrode wire, a grain size of crystals of the platinum or the platinum alloy is smaller than a diameter of the respective electrode wires.

In yet another preferred embodiment (4) of the temperature sensor of any of (1) to (3) above of the present invention, the above-mentioned crystals have a mean grain size of 20 µm or less. By imparting a mean grain size of 20 µm or less to the crystals of platinum or a platinum alloy used to form the respective electrode wires, coarsening of crystal grains can be reliably restrained, whereby the strength of the electrode wires can be stably enhanced.

In the present invention, the mean grain size of crystals of platinum or a platinum alloy is calculated as follows. First, the section of the electrode wire taken along the center axis (in other words, the section of the electrode wire which contains the center axis) is observed (observed through SEM-Scanning Electron Microscope). The major and minor diameters of at least 25 of the platinum or platinum alloy crystal grams located on the diagonal of an electrode wire image appearing on the SEM photograph are measured. The sum of a major diameter and a minor diameter of each of the crystal grains is divided by 2, and the quotient is taken as the grain size. The thus-obtained grain sizes of the measured crystals (grains) are summed. The resultant sum is divided by the number of measured crystals. The thus-obtained simple mean value is taken as the above-mentioned crystal mean grain size.

In yet another preferred embodiment (5) of the above-mentioned temperature sensor (4) of the present invention, the crystals of platinum or a platinum alloy have a mean aspect ratio of 3 or less obtained by dividing a major diameter of each of the crystals by a minor diameter of the crystal. In a conventional dispersion-strengthened platinum material in which zirconia, yttria, or a like oxide is added to platinum or a platinum alloy, crystals of platinum or the platinum alloy assume an acicular form as observed on the section of the electrode wire which contains the center axis, and thus tend to exhibit a high aspect ratio of 10 or greater. In contrast, according to the temperature sensor of the present invention, by adding strontium to platinum or a platinum alloy, coarsening of crystals of platinum or the platinum alloy is restrained. Thus, the crystals assume a shape resembling a circle or ellipse as observed on the section of the electrode wire which contains the center axis. By virtue of the approximately circular or elliptic crystals of platinum or a platinum alloy having a mean aspect ratio of 3 or less, an effect of limiting the rate of intergranular slip is effectively obtained, whereby the strength of the electrode wires can be stably enhanced. More preferably, the mean aspect ratio is 1.5 or less.

Herein, the mean aspect ratio of crystals of platinum or a platinum alloy is calculated as follows. First, the section of the electrode wire taken along the center axis is observed (observed through SEM). The major and minor diameters of at least 25 platinum or platinum alloy crystal grains located on the diagonal of an electrode wire image appearing on the SEM photograph are measured. With respect to each of the crystal grains, the quotient of dividing the major diameter by the minor diameter is taken as the aspect ratio of the crystal grain. The thus-obtained aspect ratios of the measured crystals (grains) are summed. The resultant sum is divided by the number of the measured crystals. The thus-obtained simple mean value is taken as the above-mentioned mean aspect ratio.

Also, in the present invention, the electrode wires may be formed of either platinum or a platinum alloy. However, the price of Pt group elements excluding platinum, such as rhodium and palladium, used to form a platinum alloy has soared in recent years. Thus, preferably, in view of cost, a material prepared by adding strontium to platinum (pure platinum) is used to form the electrode wires.

Furthermore, in a preferred embodiment (6), the temperature sensor of any of (1) to (5) above of the present invention comprises an enclosing member made of metal, assuming the form of a closed-bottomed tube having a bottom portion at a front end, and enclosing at least the temperature-sensing element and weld zones connecting the signal wires and the rear end portions of the electrode wires, and a ceramic filler filled in at least a portion of an inner space enclosed by the enclosing member, the portion being located between a front end of the temperature-sensing portion and the bottom portion of the enclosing member.

As mentioned previously, when such temperature sensor including a ceramic filler is subjected to rapid cooling, the bottom portion of the enclosing member presses the front end of the temperature-sensing portion (temperature-sensing element) via the filler, thereby imposing a load on the weld zones between the signal wires and the electrode wires of the temperature-sensing element. However, according to the present invention, the electrode wires are formed of a material prepared by adding strontium to platinum or a platinum alloy and are welded to the signal wires in an overlapping condition. Thus, as compared with a conventional sensor in which the electrode wires formed of a dispersion-strengthened platinum material in which zirconia, yttria, or a like oxide is added are welded to the signal wires, the temperature sensor of the present invention exhibits excellent weldability and good welding strength in welding of the electrode wires to the signal wires. Accordingly, even when a load is imposed on the weld zones as a result of rapid cooling of the temperature sensor, the weld zones exhibit excellent resistance to the load. Thus, coupled with enhanced strength of the electrode wires, the occurrence of weld zone fractures can be restrained.

DESCRIPTION OF REFERENCE NUMERALS

Figure 1:
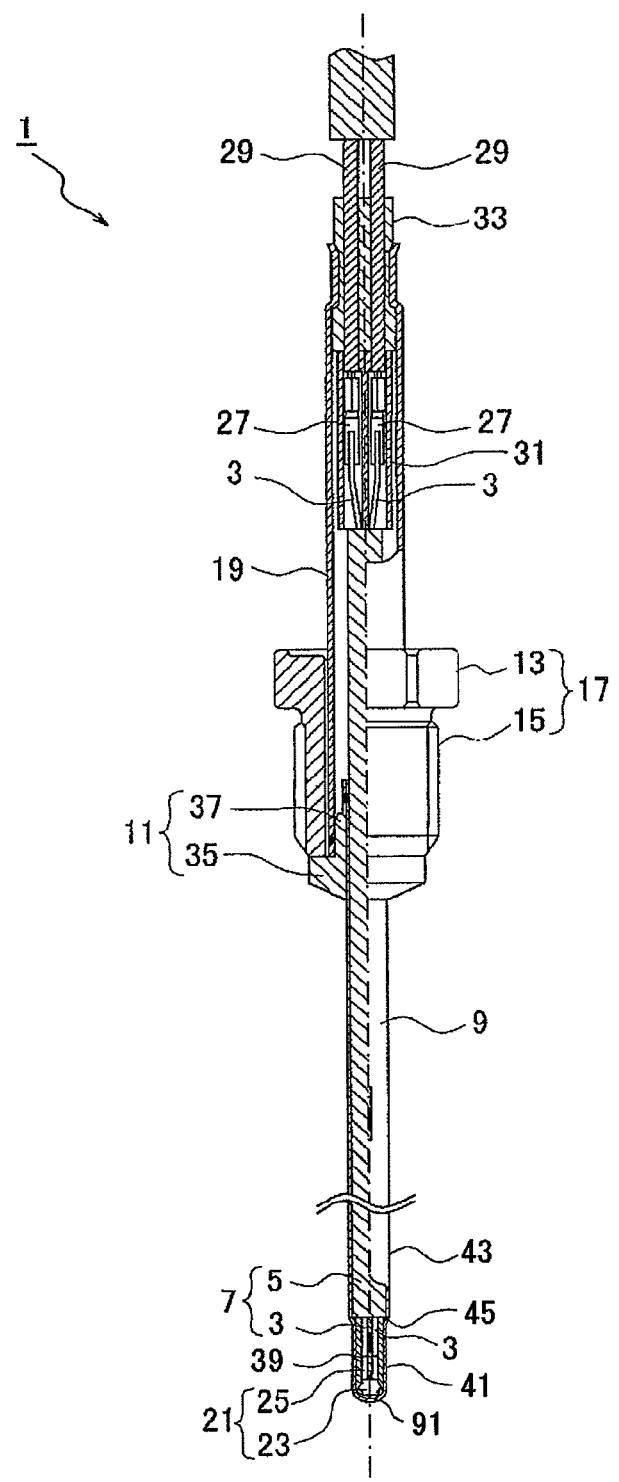
FIG. 1 is a partially cutaway sectional view showing the overall structure of a temperature sensor according to an embodiment of the present invention.

Reference numeral used to denote various structural features in the drawings include the following.

| | |
|---|---|
| 1, 101: | temperature sensor |
| 21: | thermistor element (temperature-sensing element) |
| 23: | thermistor sintered-body (temperature-sensing portion) |
| 25: | electrode wire |
| 3: | sheath core wire (signal wire) |
| 7: | sheath member |
| 9: | metal tube (enclosing member) |
| 11: | housing |
| 39: | cement (filler) |
| 47: | weld zone |
| 103: | metal cap (enclosing member) |

DETAILED DESCRIPTION OF THE PREFERRED EMBODIMENTS

Next, a preferred embodiment of the present invention will be described in detail. However, the present invention should not be construed as being limited thereto.

Figure 2:
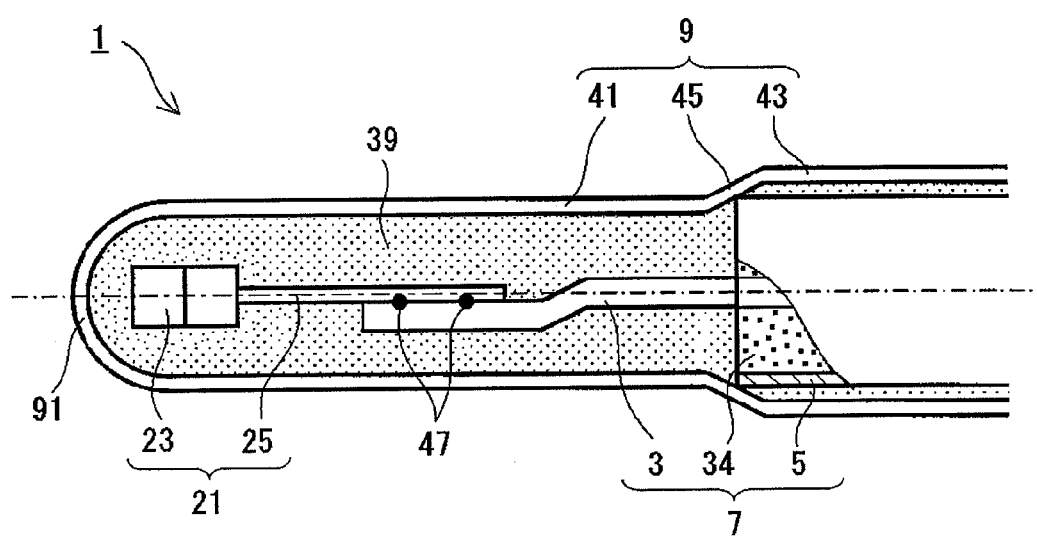
FIG. 2 is a cutaway side view showing, on an enlarged scale, a front end portion of the temperature sensor.

First, the overall configuration of a temperature sensor according to the present embodiment will be briefly described. FIG. 1 is a partially cutaway sectional view showing the overall structure of a temperature sensor 1. FIG. 2 is a cutaway side view showing, on an enlarged scale, a front end portion of the temperature sensor 1. More specifically, this is an enlarged view showing a front end portion of the temperature sensor 1 of FIG. 1 by cutting away along the axial direction so that one of paired electrodes 25 of a thermistor element 21 is visible.

The temperature sensor 1 includes a sheath member 7 configured to hold a pair of sheath core wires (signal wires) 3 within a tubular member 5 in an electrically insulated condition; a metal tube (enclosing member) 9 having a bottom portion 91 at the front end and extending in the axial direction; a housing 11 which supports the metal tube 9; a nut member 17 having a hexagonal nut portion 13 and a threaded portion 15; and a sleeve 19 internally fitted to a rear end portion of the housing 11. Notably, the axial direction is a longitudinal direction of the temperature sensor 1 and corresponds to the vertical direction in FIG. 1. The front end side of the temperature sensor 1 corresponds to a lower side in FIG. 1, and the rear end side of the temperature sensor 1 corresponds to an upper side in FIG. 1.

In the temperature sensor 1, the thermistor element 21, which serves as the temperature-sensing element, is housed within a front end portion of the metal tube 9. The temperature sensor 1 is attached to a flow tube, such as an exhaust pipe of a gasoline engine or diesel engine, in such manner that the thermistor element 21 is disposed within the flow tube in which a measurement object (in this case, exhaust gas) flows, thereby detecting the temperature of exhaust gas.

The thermistor element 21 includes a thermistor sintered-body (temperature-sensing portion) 23 and the paired electrode wires 25. The thermistor sintered-body 23 is formed by firing a thermistor material (expressed by, for example, the formula $(Y,Sr)(Fe,Mn,Al)O_3$) whose electric characteristic (electric resistance) varies with temperature. Front end portions of the electrode wires 25 are connected to the thermistor sintered-body 23, and rear end portions of the electrode wires 25 extend outward from the thermistor sintered-body 23. The paired electrode wires 25 are adapted to lead out an electric signal indicative of a variation in electric characteristic. In the present embodiment, the electrode wires 25 are embedded in the front end portion of the thermistor sintered-body 23 and thereby connected to the thermistor sintered-body 23. The material making up the electrode wires 25 will be described below.

Component members will next be described in detail.

The sheath core wires 3 corresponding to the signal wires are welded at front end portions thereof to the electrode wires 25 of the thermistor element 21 and joined at rear end portions thereof to crimp terminals 27. As a result, the sheath core wires 3 are electrically connected at the rear end portions thereof to lead wires 29 via the crimp terminals 27. The lead wires 29 are adapted to establish connection to an external circuit (e.g., an engine control unit of an automobile).

The insulation tube 31 electrically insulates the paired sheath core wires 3 from each other and the paired crimp terminals 27 from each other. Each of the lead wires 29 is a conductor coated with an electrically insulative coating material. The lead wires 29 are disposed so as to extend through an auxiliary ring 33 made of heat-resisting rubber.

The sheath member 7 includes the tubular member 5 made of a stainless steel alloy; the paired sheath core wires 3 made of a stainless steel alloy; and an insulation powder 34 (see FIG. 2), such as silica, for holding the sheath core wires 3 so as to electrically insulate the two sheath core wires 3 from the tubular member 5.

The housing 11 has a projection (flange) 35, which projects radially outward, and a rear sheath portion 37, which is located at the rear end of the projection 35 and extends in the axial direction. The housing 11 supports the metal tube 9 while surrounding the outer circumferential surface of a rear end portion of the metal tube 9.

The metal tube 9 corresponding to the enclosing member is formed of an anticorrosive metal (e.g., a stainless steel alloy, such as SUS310S, which is also resistant to heat). The metal tube 9 is formed by deep drawing a steel sheet and assumes the form of a tube which extends in the axial direction, has the bottom portion 91 at the front end, and is open at the rear end. As shown on an enlarged scale in FIG. 2, the metal tube 9 has a small-diameter portion 41, whose diameter is set small, on a side toward the front end; a large-diameter portion 43, whose diameter is set larger than that of the small-diameter portion 41, on a side toward the rear end; and a step portion 45 located between the small-diameter portion 41 and the large-diameter portion 43.

The interior (inner space) of the metal tube 9 accommodates the thermistor element 21 and cement 39. Specifically, the cement 39 is filled in almost the entire inner space of the metal tube 9 including a space between the front end of the thermistor sintered-body 23 and the bottom portion 91 of the metal tube 9, thereby yielding the effect, among others, of preventing oscillation of the thermistor element 21 when the temperature sensor 1 is subjected to vibration. The cement 39 is formed of an insulation material comprising amorphous silica containing alumina aggregate, or is formed of magnesium oxide.

In the present embodiment, rear end portions (right end portions in FIG. 2) of the electrode wires 25 of the thermistor element 21 and front end portions (left end portions in FIG. 2) of the sheath core wires 3 are laid to overlap one another in the axial direction and laser-welded to one another. In the present embodiment, laser welding is performed at two positions on each of overlapping portions of the electrode wires 25 and the sheath core wires 3, thereby forming two weld zones 47 each.

In the temperature sensor 1 of the present embodiment, the paired electrode wires 25 of the thermistor element 21 are formed of a material prepared by adding strontium to platinum or a platinum alloy. Preferably, the electrode wires 25 contain strontium in an amount of 0.1% by mass to 1.0% by mass inclusive. In the present embodiment, the electrode wires 25 have a diameter of 0.3 mm, and are formed of a material prepared by adding strontium in an amount of 0.9% by mass to platinum. That is, the electrode wires 25 do not contain metal elements such as zirconium, yttrium, aluminum and titanium associated with those oxides which are used to obtain conventional dispersion-strengthened platinum materials. This can be confirmed by the fact that, in X-ray fluorescence analysis of the electrode wire 25, zirconium (Zr), yttrium (Y), aluminum (Al), titanium (Ti), and like metal elements are not detected.

No particular limitation is imposed on a method of manufacturing the electrode wires 25. However, the electrode wires 25 can be manufactured by the steps of adding strontium in a predetermined amount to a raw material, namely platinum or a platinum alloy; melting the resultant mixture in an inert atmosphere within a melting furnace; and subjecting the resultant material to wire drawing.

The present embodiment uses a material prepared by adding strontium in an amount of 0.9% by mass to platinum to form the electrode wires 25, whereby the electrode wires 25 can exhibit high mechanical strength, particularly high creep strength, without addition of zirconia, yttria, or a like oxide as practiced conventionally. The reason why the strength of the electrode wires 25 is enhanced is uncertain. Presumably, addition of strontium generates platinum-strontium intermetallic compounds ($Pt_xSr_y$: x and y are positive integers), and the presence of the intermetallic compounds restrains coarsening of crystal grains of platinum or a platinum alloy in the electrode wires.

When the electrode wires 25 are observed on a section perpendicular to a center axis of the electrode wire 25, the grain size of crystals of platinum or a platinum alloy is smaller than the wire diameter of the respective electrode wires 25. In this manner, the rate of intergranular slip is limited, thereby imparting high strength to the electrode wire 25. Preferably, the mean grain size of the above-mentioned crystals is 20 μm or less. The method for measuring the mean grain size is described above. Furthermore, preferably, the mean aspect ratio of the above-mentioned crystals is 3 or less. The method for measuring the mean aspect ratio is described above. By means of imparting a small mean grain size and a low mean aspect ratio to crystals of platinum or a platinum alloy, coarsening of the crystals is restrained, thereby enhancing the strength of the electrode wire 25.

In the temperature sensor 1 of the present embodiment, rear end portions of the electrode wires 25, which are formed of the above-mentioned material and have a wire diameter of 0.3 mm, and front end portions (left end portions in FIG. 2) of the sheath core wires 3, which are formed of a stainless steel alloy and have a wire diameter of 0.5 mm, are laid to overlap one another in the axial direction and laser-welded to one another. Thus, as compared with the conventional case where a dispersion-strengthened platinum material, which contains zirconia, yttria, or a like oxide as an additive, is welded to the sheath core wires, the weld zones 47 are free from deterioration in weldability, which would otherwise result from such an oxide having a melting point that is far higher than that of platinum and therefore remaining unmelted. Thus, the electrode wires 25 and the sheath core wires 3 are welded to one another with good welding strength. In the present embodiment, the electrode wires 25 and the sheath core wires 3 are welded to one another by laser welding. However, the welding method is not limited thereto. Resistance welding, electron beam welding, or the like may be employed.

In the temperature sensor 1 of the present embodiment, a ceramic filler (cement 39) is filled in at least a portion of an inner space enclosed by the metal tube 9, the portion being located between the front end of the thermistor sintered-body 23 and the bottom portion 91 of the metal tube 9. In this structure, upon being subjected to rapid cooling, the bottom portion 91 of the metal tube 9 presses the front end of the thermistor sintered-body 23 (thermistor element 2) via the cement 39; thus, a load is apt to be imposed on the weld zones 47.

However, in the temperature sensor 1 of the present embodiment, the electrode wires 25 are formed of a material prepared by adding strontium to platinum or a platinum alloy and are welded to the sheath core wires 3 in an overlapping condition. Thus, as compared with a conventional temperature sensor in which the electrode wires formed of a dispersion-strengthened platinum material in which zirconia, yttria, or a like oxide is added are welded to the signal wires, the temperature sensor 1 of the present embodiment exhibits excellent weldability and good welding strength in welding of the electrode wires 25 to the sheath core wires 3. Accordingly, even when a load is imposed on the weld zones 47 as a result of the temperature sensor 1 being rapidly cooled, the weld zones 47 exhibit excellent resistance to the load. Thus, coupled with enhanced strength of the electrode wires 25, the occurrence of weld zone fractures can be restrained.

Experiment for Confirming the Effects of the Present Invention

Next, an experiment conducted to confirm the effects of the present invention is described below.

The electrode wire of Example 1 had a wire diameter of 0.3 mm and was formed of a material prepared by adding strontium in an amount of 0.9% by mass to pure platinum. The electrode wire of Example 2 had a wire diameter of 0.3 mm and was formed of a material prepared by adding strontium in an amount of 0.7% by mass to a Pt-3Rh (mass %) alloy. The electrode wire of Comparative Example 1 had a wire diameter of 0.3 mm and was formed of pure platinum. The electrode wire of Comparative Example 2 was formed of a material prepared by adding zirconia in an amount of 0.1% by mass to pure platinum. In the present experiment, instead of forming thermistor elements using the electrode wires thus prepared, the following structural bodies were prepared for use in the experiment: the electrode wires were heat-treated under the same conditions as those for firing of a thermistor material (1,550° C. for 2 hours in the atmosphere), and the heat-treated electrode wires and the sheath core wires made of a stainless steel alloy and having a wire diameter of 0.5 mm were laid in an overlapping condition, followed by laser welding at two positions each of the overlapping portions. Laser welding was carried out under the following conditions: Nd:YAG laser; power 1.0 J; time of irradiation 2.0 ms; and spot diameter 0.4 mm.

Figure 3:
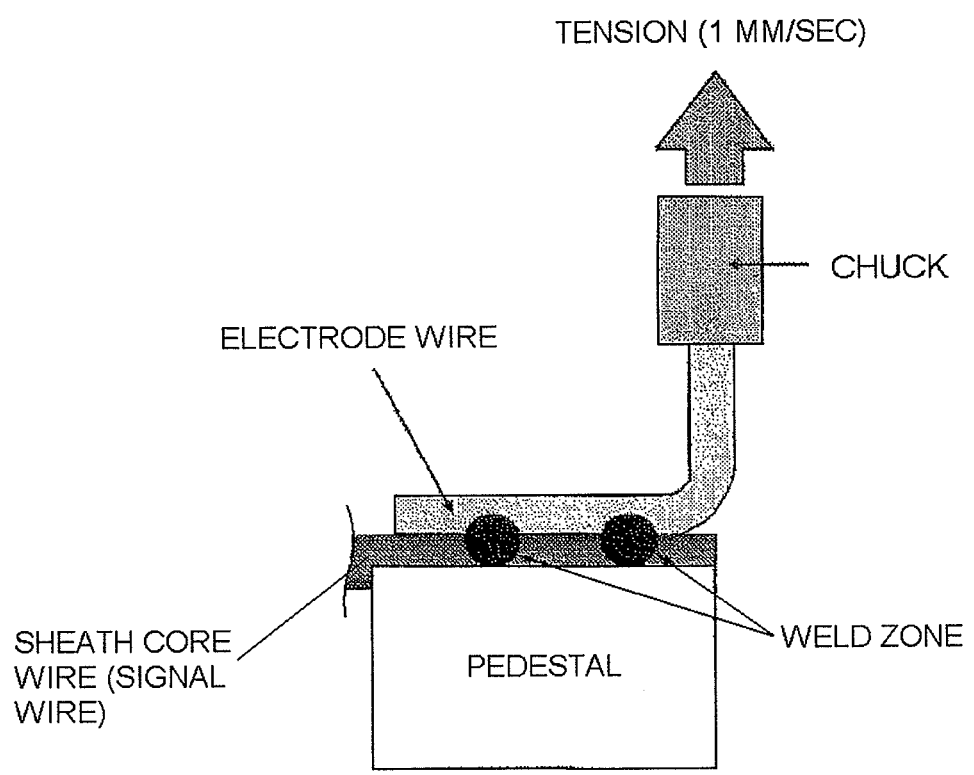
FIG. 3 is an explanatory view showing the outline of a tension test on a structure prepared by welding an electrode wire and a sheath core wire (signal wire) to each other and the outline of a tension tester.

Next, the structural bodies, each being formed by laser-welding the electrode wire and the sheath core wire to one another, were subjected to a tension test conducted using the tensile strength tester shown in FIG. 3. Specifically, the chuck which held one end portion of the electrode wire was pulled at a rate of 1 mm/sec to determine whether the electrode wire and the sheath core wire would separate from one another at the weld zones. In the case of no separation at the weld zones in the tension test, the strength (tensile strength) at which the electrode wire was broken was obtained. Aside from the tensile strength test, the electrode wires of the structural bodies were observed through SEM. Specifically, the section of each of the electrodes, excluding the weld zones, taken along the center axis was observed through SEM (at 200 magnifications). On the basis of the obtained SEM photographs, the mean grain size and mean aspect ratio of crystals (crystals of platinum or platinum-rhodium alloy) were obtained for each of the electrode wires as described above.

Figure 5:
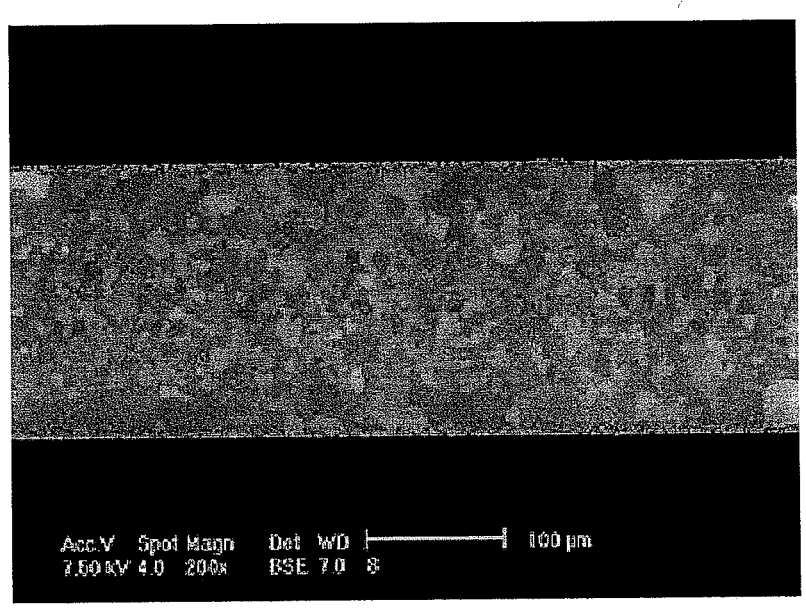
FIG. 5 is a sectional view (SEM photograph) of an electrode wire (formed of a material prepared by adding strontium in an amount of 0.9% by mass to platinum) of Example 1 taken along the center axis.

The following Table 1 shows the results of the above-mentioned tensile strength test and the mean grain sizes and mean aspect ratios of crystals (crystals of platinum or platinum-rhodium alloy) of the electrode wires. Also, FIG. 5 shows the section (SEM photograph) of the electrode wire of Example 1 which contains the center axis.

TABLE 1

| | Separation at weld zone | Strength on breakage of electrode wire (N) | Mean grain size (μm) | Mean aspect ratio |
|---|---|---|---|---|
| Example 1 | No | 26.8 | 14.1 | 1.3 |
| Example 2 | No | 24.3 | 18.3 | 1.3 |
| Comparative Example 1 | No | 13.3 | 243 | 1.8 |
| Comparative Example 2 | Yes | — | 80.9 | 12.0 |

As is apparent from the results shown in Table 1, separation at the weld zone(s) occurred in the structural body of Comparative Example 2 employing the electrode wire formed of a material prepared by adding zirconia in an amount of 0.1% by mass to platinum. In contrast, separation at the weld zone(s) 47 did not occur in the structural bodies of Examples 1 and 2. These results confirm that in the case of welding the electrode wire 25, formed of a material prepared by adding strontium to platinum or to a platinum alloy comprising platinum and at least one element (excluding platinum) selected from the platinum group, to the sheath core wire 3, excellent weldability and good welding strength were obtained in contrast to Comparative Example 2.

In the structural body of Comparative Example 1, separation at the weld zone(s) did not occur; however, the electrode wire was broken at a relatively low strength (tensile strength) of 13.3 N. In contrast, the electrode wires 25 were broken at very high strengths (tensile strengths) of 26.8 N and 24.3 N in the structural bodies of Example 1 and in the structural body of Example 2, respectively. These results confirm that the electrode wires 25 formed of a material prepared by adding strontium to platinum exhibit enhanced strength.

A comparison of mean grain size of crystals among the electrode wires confirms that the mean grain size of crystals of platinum of the electrode wire of Example 1 and that of platinum-rhodium alloy of the electrode wire of Example 2 were relatively very small as compared with those of the crystals of platinum of Comparative Examples 1 and 2. Also, comparison of mean aspect ratio of crystals among the electrode wires confirms that the electrode wire of Comparative Example 2 formed of a material prepared by adding zirconia to platinum exhibited a high mean crystal aspect ratio in excess of 10, whereas the electrode wires of Examples 1 and 2 exhibited a very low mean crystal aspect ratio of crystals of 1.3. Particularly, the electrode wires of Examples 1 and 2 exhibited mean crystal aspect ratios of platinum and platinum-rhodium alloy, respectively, which were close to 1. This indicates that the crystals assumed a shape resembling circle or ellipse (see FIG. 5).

Second Embodiment

The present invention is not limited to the above-described embodiment, but may be embodied in various other forms without departing from the gist of the invention.

For example, the above-described embodiment employs a configuration in which cement 39 is charged into metal tube 9. However, a configuration in which cement 39 is not charged may be employed.

The temperature sensor 1 of the above-described embodiment uses the thermistor element as a temperature-sensing element. However, the temperature-sensing element may be configured such that the electrode wires are connected to a platinum resistor provided in a ceramic substrate and serve as a temperature-sensing portion. The temperature sensor 1 is described while mentioning the electrode wires 25 formed of a material prepared by adding strontium to platinum. However, the electrode wires may be formed of a material prepared by adding strontium to a platinum alloy (e.g., platinum-rhodium alloy, platinum-iridium alloy, or platinum-palladium alloy). Even when the thus-formed electrode wires are used, effects similar to those of the temperature sensor 1 of the above-described embodiment are obtained.

Figure 4:
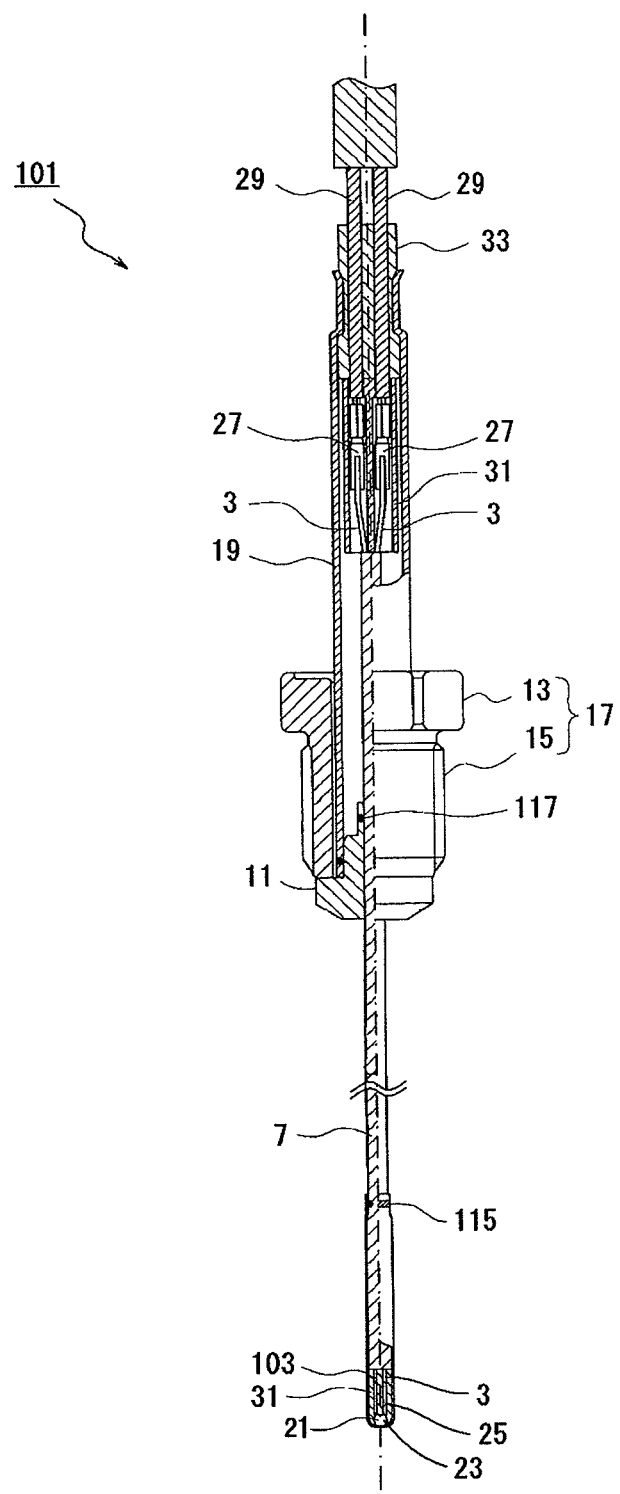
FIG. 4 is a partially cutaway sectional view showing the overall structure of a temperature sensor according to a modification of the embodiment.

The present invention is not limited to the temperature sensor 1 of the above-described embodiment, but may be applied to a temperature sensor 101 of an embodiment (modified embodiment) shown in FIG. 4.

Specifically, the temperature sensor 101 shown in FIG. 4 has a metal cap 103 in place of the metal tube 9 of the above-described embodiment. The metal cap 103, which serves as an enclosing member, assumes the form of a tube which extends in the axial direction, has a closed bottom portion at the front end (lower end in FIG. 4), and is open at the rear end. In the temperature sensor 101 of the modified embodiment shown in FIG. 4, configurational features similar to those of the temperature sensor 1 of the embodiment shown in FIG. 1 are denoted by common reference numerals, and redundant description thereof is omitted in the following description.

While the metal cap 103 houses the thermistor element 21 (temperature-sensing element) and the cement 39 (filler) within a front end portion, all-around welding (e.g., all-around laser welding) is performed in a state in which the inner circumferential surface of a rear end portion of the metal cap 103 overlies an outer circumferential surface of the tubular member 5 of the sheath member 7, thereby forming a weld zone 115. Thus, the metal cap 103 is fixedly attached to the sheath member 7.

The sheath member 7 is inserted through an insertion hole of the housing 11, and all-around welding (e.g., all-around laser welding) is performed, thereby forming a weld zone 117. Thus, the sheath member 7 is fixedly attached to the housing 11.

The temperature sensor 101 of the modified embodiment employs the following structural features. The electrode wires 25 extending from the thermistor sintered-body 23 of the thermistor element 21 are formed of a material prepared by adding strontium to platinum (or a platinum alloy comprising platinum and at least one element (excluding platinum) selected from the platinum group). The electrode wires 25 are welded in an overlapping condition to the sheath core wires (signal wires) 3, which partially constitute the sheath member 7. Thus, the temperature sensor 101 yields effects similar to those of the temperature sensor 1 of the above-described embodiment, such as excellent weldability in welding the electrode wires 25 and the sheath core wires 3 to one another, and enhanced strength of the electrode wires 25.

It should further be apparent to those skilled in the art that various changes in form and detail of the invention as shown and described above may be made. It is intended that such changes be included within the spirit and scope of the claims appended hereto.

This application is based on Japanese Patent Application Nos. JP 2008-165267 filed Jun. 25, 2008 and JP 2009-58705 filed Mar. 11, 2009, the above-noted applications incorporated herein by reference in their entirety.

What is claimed is:

1. A temperature sensor comprising:
    a temperature-sensing element having a temperature-sensing portion whose electric characteristic varies with temperature, and electrode wires whose front end portions are connected to the temperature-sensing portion and whose rear end portions extend outward from the temperature-sensing portion, and
    signal wires welded to the rear end portions of the electrode wires in an overlapping condition and adapted to lead an electric signal out from the temperature-sensing element,
    wherein the electrode wires are formed of a material prepared by adding strontium to platinum, and
    wherein the platinum is pure platinum and the material consists of platinum and strontium.

2. The temperature sensor according to claim 1, wherein the electrode wires contain strontium in an amount of 0.1% by mass to 1.0% by mass inclusive.

3. The temperature sensor according to claim 1, wherein, when the electrode wires are observed on a section perpendicular to a center axis of the electrode wire, a grain size of crystals of the platinum or the platinum alloy is smaller than a diameter of the respective electrode wires.

4. The temperature sensor according to claim 1, wherein, when the electrode wires are observed on a section which contains a center axis of the electrode wire, crystals of the platinum or the platinum alloy used to form the respective electrode wires have a mean grain size of 20 μm or less.

5. The temperature sensor according to claim 4, wherein, when the electrode wire is observed on the section which contains the center axis of the electrode wire, the crystals of the platinum or the platinum alloy used to form the electrode wire have a mean aspect ratio of 3 or less obtained by dividing a major diameter of each of the crystals by a minor diameter of the crystal.

6. The temperature sensor according to claim 1, further comprising:
    an enclosing member made of metal, assuming the form of a closed-bottomed tube having a bottom portion at a front end, and enclosing at least the temperature-sensing element and weld zones connecting the signal wires and the rear end portions of the electrode wires, and
    a ceramic filler filled in at least a portion of an inner space enclosed by the enclosing member, the portion being located between a front end of the temperature-sensing portion and the bottom portion of the enclosing member.

* * * * *